United States Patent [19]
Hobbs

[11] Patent Number: 5,908,491
[45] Date of Patent: Jun. 1, 1999

[54] AIR CLEANER

[76] Inventor: Roy Hobbs, 1102 Lower Bridge Rd., Crawfordville, Fla. 32327

[21] Appl. No.: 08/986,484

[22] Filed: Dec. 8, 1997

[51] Int. Cl.$^6$ .................................................. B01D 47/00
[52] U.S. Cl. ................................ 95/202; 95/205; 96/239; 96/249; 96/250; 96/262; 96/269; 96/279; 96/343; 96/351
[58] Field of Search .............................. 96/239, 249, 250, 96/262, 269, 276, 279, 283, 309, 329, 340, 342, 343, 351; 95/202, 205

[56] References Cited

U.S. PATENT DOCUMENTS

| | | | |
|---|---|---|---|
| 3,485,015 | 12/1969 | Vecchio | 96/351 |
| 3,563,005 | 2/1971 | Jones | 96/239 |
| 4,251,486 | 2/1981 | Sohda | 96/279 |
| 4,859,405 | 8/1989 | Squarer et al. | 96/351 |
| 4,861,558 | 8/1989 | Lehto | 96/351 |
| 4,939,809 | 7/1990 | Park | 96/351 |
| 5,035,346 | 7/1991 | Kalman | 96/409 |
| 5,364,424 | 11/1994 | Junior | 96/343 |

*Primary Examiner*—Jay H. Woo
*Assistant Examiner*—Minh-Chau T. Pham
*Attorney, Agent, or Firm*—Peter Loffler

[57] ABSTRACT

An air cleaner for efficiently providing clean air for a structure is comprised of a housing having an intake port and an exhaust port. At least one air chamber having a liquid reservoir at its base is disposed within the housing. A fan draws air through the intake port and the air passes in turn through each liquid reservoir and then its air chamber and discharges the air through the exhaust port. A switch controls the fan and is turned off whenever the liquid level within the device is improper with the device having a flush valve for discharging exhaust liquid and a liquid fill valve for introduction of liquid.

10 Claims, 3 Drawing Sheets

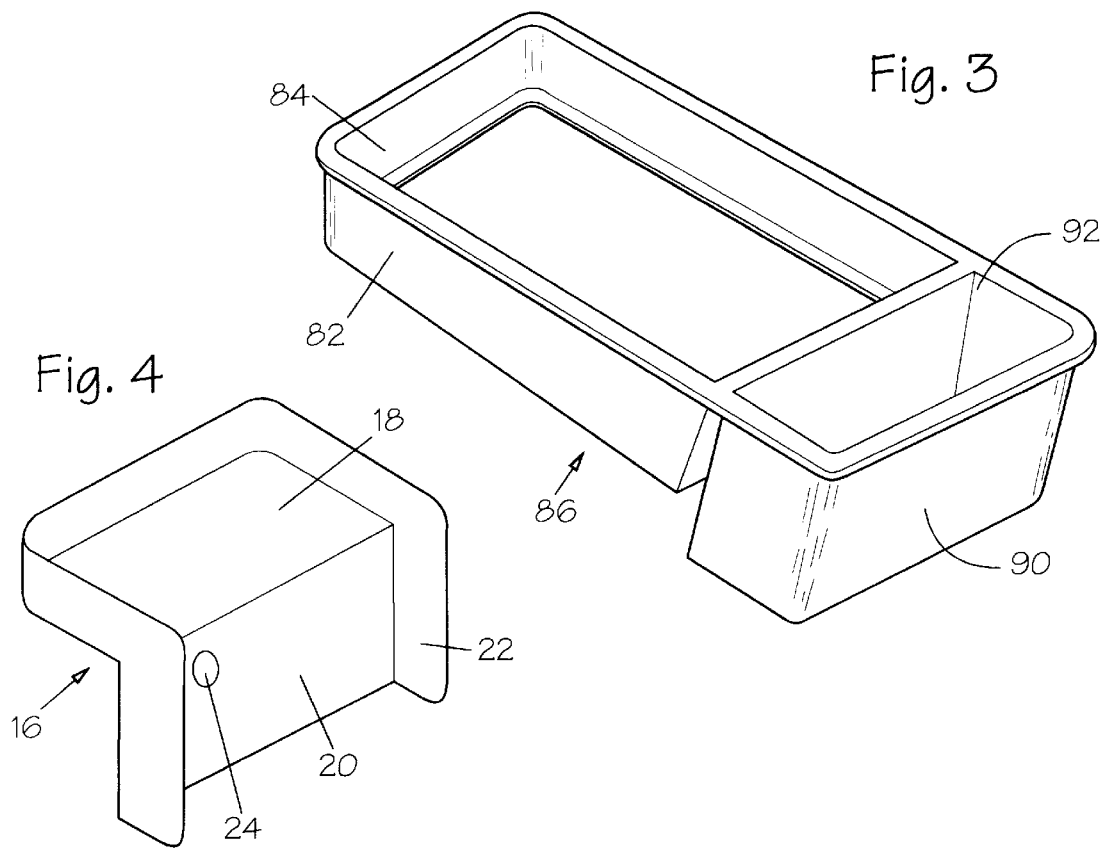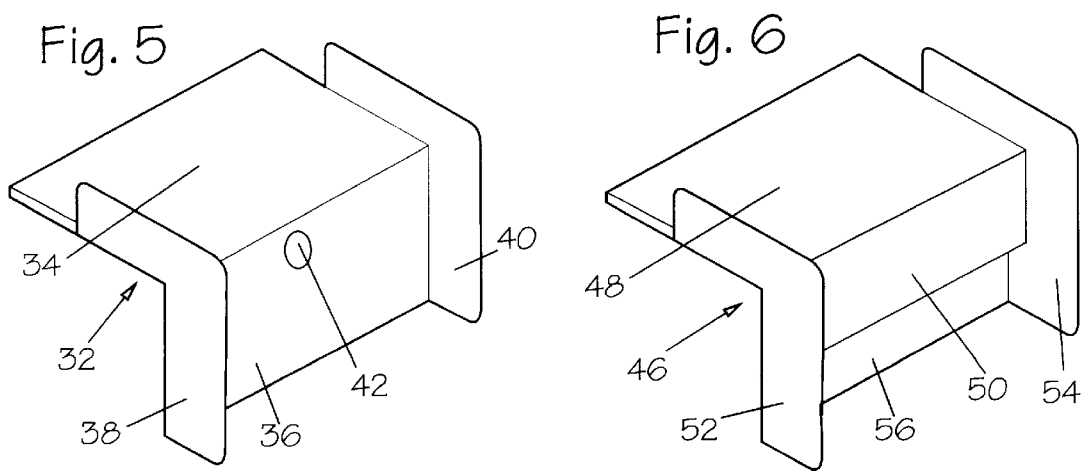

AIR CLEANER

BACKGROUND OF THE INVENTION

1. Field of the Invention

The present invention relates to a water-based air cleaner for a structure.

2. Background of the Prior Art

A typical house will cycle through its entire volume of air about 3 times a day. This flowing air brings about 50 pounds of dust, pollen, and other pollutants into the home each year. Furthermore, if the house is tightly sealed, the internal air will become stale allowing pollutants more harmful than those brought in by the flowing air to develop.

In order to address these pollutants, air cleaning systems have been proposed. Such systems typically comprise an air handler that forces air through a mesh-type filter that traps pollutants thereby removing them from the air. However, such filters tend to trap only the relatively large particles already in the house and do nothing to impede particles from entering the house.

Therefore, there is a need in the art for an air cleaner that can intercept pollutants and provide the house with clean fresh air. Such a device should be of relatively simple and straightforward design and construction and should be efficient in use.

SUMMARY OF THE INVENTION

The air cleaner of the present invention addresses the aforementioned needs in the art. The air cleaner uses liquid, such as water, to accomplish the filtering process. The liquid absorbs particles that are too small to be trapped by a typical mesh-type filter. The air cleaner is relatively simple in design and is efficient in operation. In operation, the air cleaner of the present invention slightly elevates the pressure within the structure within which it is installed. This increase in pressure forces most of the air entering the structure to pass through the air cleaner.

The air cleaner is comprised of a housing having an intake port and an exhaust port. At least one air chamber having a liquid reservoir for receiving liquid, such as water, is disposed within the housing. A switch controlled fan draws air through the intake port and the air passes in turn through each liquid reservoir and then its air chamber and discharges the air through the exhaust port. A flush valve is located at the base of the housing. A rod having a float is mechanically connected to the switch and to the flush valve. Improper liquid levels within the housing will act on the float, in turn acting on the rod which turns the switch off. A timer controlled solenoid also operates on the rod. A liquid fill valve introduces liquid into the device to the proper liquid level.

BRIEF DESCRIPTION OF THE DRAWINGS

FIG. 3 is an isometric view of the first and second support brackets of the air cleaner.

FIG. 4 is an isometric view of the first bracket of the air cleaner.

FIG. 5 is an isometric view of the second bracket of the air cleaner.

FIG. 6 is an isometric view of the third bracket of the air cleaner.

Similar reference numerals refer to similar parts throughout the several views of the drawings.

DESCRIPTION OF THE PREFERRED EMBODIMENT

Figure 1:
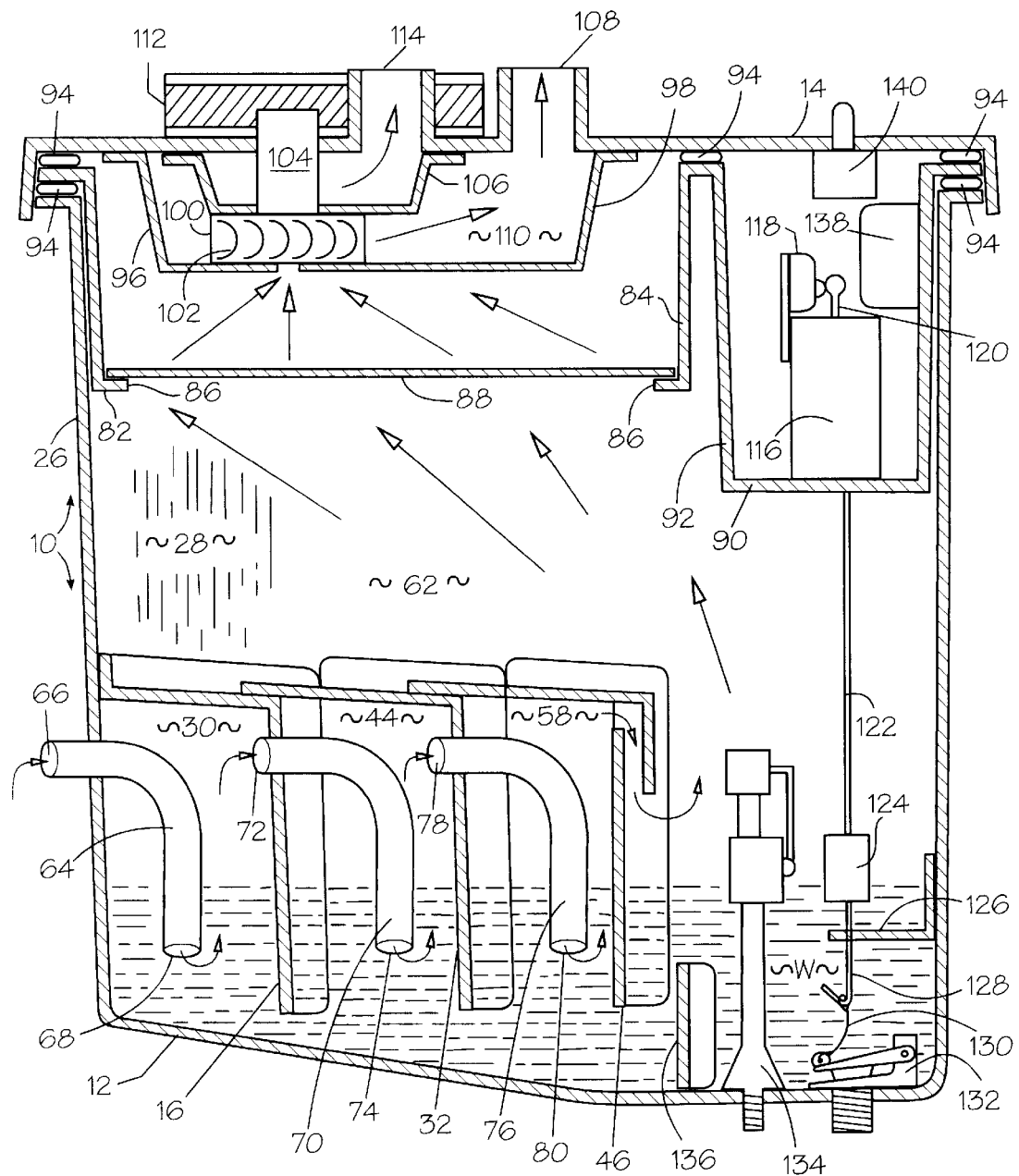
FIG. 1 is a cutaway view of the air cleaner of the present invention.
Figure 2:
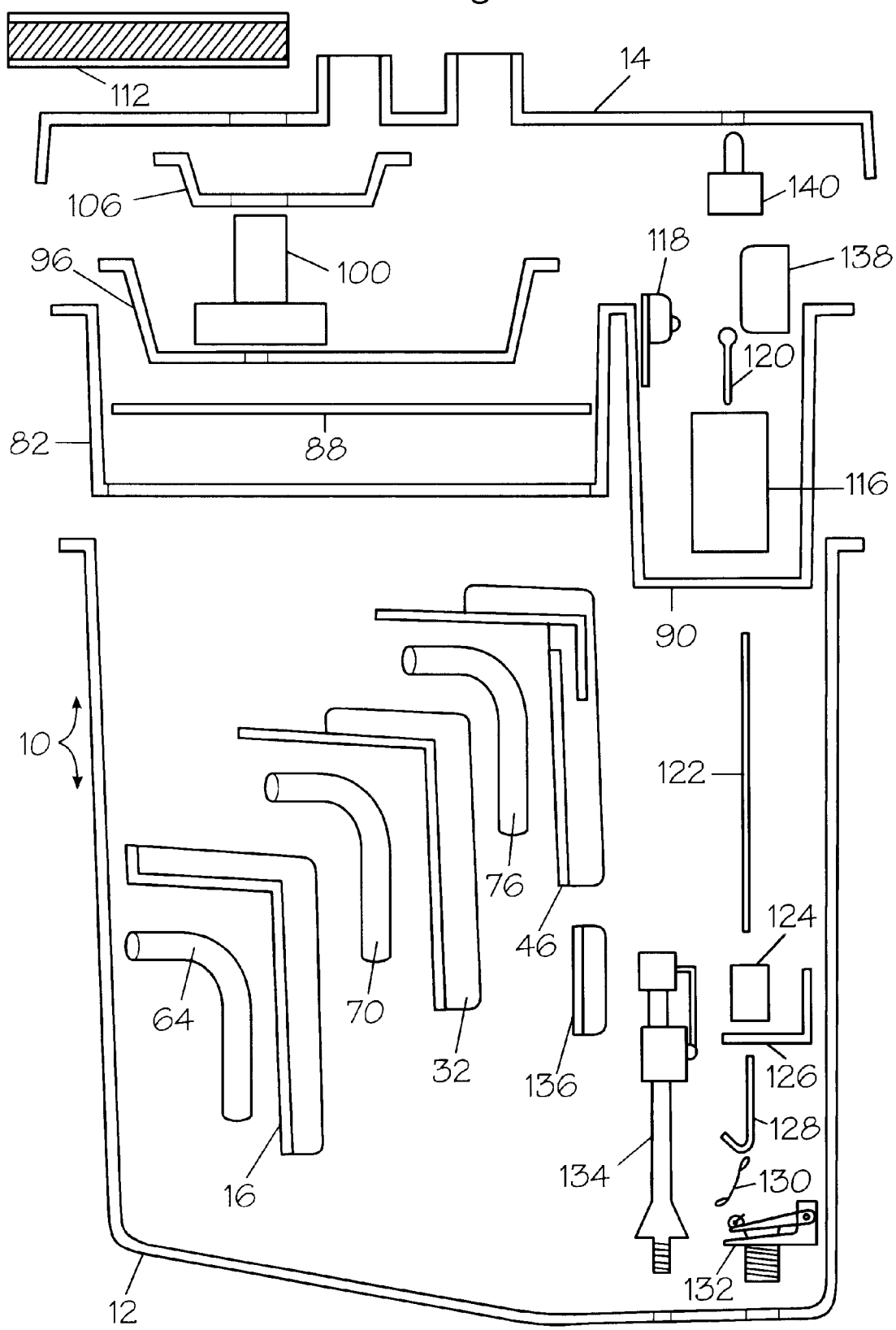
FIG. 2 is an exploded view of the air cleaner.

Referring now to the drawings, it is seen that the air cleaner of the present invention, generally denoted by reference numeral 10, is comprised of a housing 12 having a lid 14 removably attached to the top. Located within the base of the housing 12 is a water reservoir having water W therein.

As seen in FIGS. 1 and 4, a first bracket 16, has a generally downwardly sloping top plate 18 integrally attached to a side plate 20. A flange 22 extends upwardly from the bottom of the side plate 20, extends around the outer periphery of the top plate 18 and terminates at the bottom of the side plate opposite the commencement point. An aperture 24 is located in the side plate 20. The first bracket 16 has part of its flange 22 attached to one of the end walls 26 and the remainder of the flange 22 to both side walls 28 of the housing 12. The side plate 20 terminates within the water W. The first bracket 16 in combination with the end wall 26 and the side walls 28 define a first air chamber 30.

As seen in FIGS. 1 and 5, a second bracket 32 has a generally downwardly sloping top plate 34 integrally attached to a side plate 36. A first flange 38 extends along left side of the side plate 36 and top plate 34 and terminates prior to the end of the top plate 34. A second flange 40 extends along the right side of the side plate 36 and the top plate 34 and terminates prior to the end of the top plate 34. An aperture 42 is located in the side plate 36. The second bracket 32 is positioned so that its top plate 34 overlaps the first bracket's top plate 18 such that the flanges of the two brackets meet. The second bracket's flanges 38 and 40 each attach to one of the side walls 28. The side plate 36 terminates within the water W. The second bracket 32, in combination with the side plate 20 of the first bracket 16 and the side walls 28 define a second air chamber 44.

As seen in FIGS. 1 and 6 a third bracket 46 has a generally downwardly sloping top plate 48 integrally attached to a first side plate 50. A first flange 52 extends along left side of the first side plate 50 and top plate 48 and terminates prior to the end of the top plate 48. A second flange 54 extends along the right side of the first side plate 50 and the top plate 48 and terminates prior to the end of the top plate 48. A second side plate 56 extends between the first flange 52 and the second flange 54. The second side plate 56 terminates below the top plate 48 and is in spaced apart relation to the first side plate 50. The third bracket 46 is positioned so that its top plate 48 overlaps the second bracket's top plate 34 such that the flanges of the two brackets meet. The third bracket's flanges 52 and 54 each attach to one of the side walls 28. The second side plate 56 terminates within the water W while the first side plate 50 does not. The third bracket 46, in combination with the side plate 36 of the second bracket 32 and the side walls 28 define a third air chamber 58. The first side plate 50 and the upper portion (above the water W) of the second side plate 56 in combination with the side walls 28 define a first air passage 60.

A fourth air chamber 62 is defined above the three brackets 16, 32, and 46.

A first air hose 64, has a first end 66 received within an aperture on the end wall 26 and terminates in the outside atmosphere, and a second end 68 that terminates within the water W below the first air chamber 30. A second air house 70, has a first end 72 received within the aperture 24 on the first bracket's side plate 20 and terminates in the first air chamber 30, and a second end 74 that terminates in the water W below the second air chamber 44. A third air hose 76, has a first end 78 received within the aperture 42 of the second bracket's side plate 36 and terminates in the second air chamber 44, and a second end 80 that terminates within the water W below the third air chamber 58. Advantageously, the first 64, second 70, and third 76 air hoses will having gradual bends for smooth air flow therethrough.

As seen in FIGS. 1 and 3, a first support 82, having an encompassing sidewall 84 and an open bottom 86, is removably secured within the housing 12. A diffuser plate 88 having a plurality of openings (not illustrated) is removably seated on the first support 82 positioned over the open bottom 86.

As seen in FIGS. 1 and 3, a second support 90 having encompassing side walls 92, and optionally attached to the first support 82, is removably secured to the housing 12. If desired, the first support 82 and the second support 90 can be formed as a single integral unit. The unit can be seated on the upper lip of the housing 12 with appropriate gaskets 94 provided between the unit and the housing 12 as well as between the unit and the lid 14 of the housing 12 so as to assure a pneumatic seal.

A third support 96, having an encompassing sidewall 98, is attached to the lid 14 and has an opening therein. A fan 100, having a plurality of exhaust ducts 102, is seated on the third support 96 above the opening. The fan 100 is powered by a motor 104. A fourth support 106, which pneumatically separates the fan 100 from the motor 104, provides support for the motor 104 and also creates, together with an exhaust duct 108, an exhaust air passage 110 for the fan 100. The motor 104, receives its cooling air external of the device 10. The cooling air passes through a filter 112 of any appropriate design before being received by the motor 104 and is thereafter discharged through an exhaust duct 114.

Located within the second support bracket 90 is a solenoid 116 and a microswitch 118. A first rod 120 has one end connected to the solenoid 116 and its opposing end terminates proximate to the microswitch 118. A second rod 122 has one end connected to the solenoid 116, protrudes through the second support 90 and has a float 124 attached to the opposing end. A stop bracket 126 is attached to the housing 12 below the float 124. A guide hook 128 has its top connected to the float 124 and has a pull cord 130 connected to its hooked end. The end of the pull cord 130 is connected to a flush valve 132. A water fill valve 134, of any appropriate design, is located within the water reservoir. An extension 136 is attached to one or both side walls 28, proximate the flush valve 132 and water fill valve 134. A timer 138 and an on/off switch 140 are also electrically attached to the device 10.

In operation, the device 10 is filled with sufficient water W such that the second ends 68, 74, and 80 of all three hoses 64, 70, and 76 respectively, and the ends of the first bracket's side plate 20, the second bracket's side plate 36, and the third bracket's second side plate 56 all terminate within the water W. The fan 100 is activated causing a vacuum to be created within the device 10. This will cause air to be drawn into the device 10. The incoming air will pass through the first air hose 64 and will be deposited within the water W below the first air chamber 30. The air will then enter the first air chamber 30 and will be drawn through the second air hose 70 and will be deposited within the water W below the second air chamber 44. The air will then enter the second air chamber 44 and be drawn through the third air hose 76 and will be deposited within the water W below the third air chamber 58. The air will then enter the third air chamber 58 and will be drawn through the first air passage 60 into the fourth air chamber 62, through the diffuser plate 88, through the fan 100 and out through the exhaust air passage 110 and the exhaust duct 108.

As the air enters the water W below each of the first three air chambers, it causes turbulence within the water W. The turbulent nature of the water W scrubs and removes debris held by the incoming air. As the air passes rushes through the first air passage 60, the air is headed downwardly toward the water W before turning upwardly into the fourth air chamber 62. This downward orientation of the rushing air will cause most of the moisture held by the air to be deposited back onto the water's surface. Furthermore, as the air is moving quicker through the first air passage 60 relative to its movement through the fourth air chamber 62, the loss of energy of the air in the fourth air chamber 62 will result in the air not being able to carry upwardly any remaining moisture and thus the moisture will fall downwardly. The diffuser plate 88 slows and spreads the air stream approaching that fan 100.

It is expressly understood that the first air chamber 30 and the second air chamber 44 improve cleaning efficiency and are not required in order to achieve device functionality.

If the water level in the device 10 gets too low, the float 124, as it rides downwardly with the decreasing water level (the stop bracket 126 assures that the float 124 does not ride down too far), will pull downwardly on the second rod 122. This will also cause downward articulation of the first rod 120 which will trigger the microswitch 118 and thereby automatically turn the fan 100 off. Ideally, the water fill valve 134 will automatically refill the device 10 to its proper water level. Once the proper water level is reached, the float 124 will ride upwardly, causing upward articulation of the second rod 122 which causes upward articulation of the first rod 120 thereby triggering the microswitch and restarting the fan 100.

If the water level in the device 10 gets too high, the float 124, as it rides upwardly with the increasing water level, will push upwardly on the second rod 122. This will also cause upward articulation of the first rod 120 which will trigger the microswitch 118 and thereby automatically turn the fan 100 off. The float 124 will also pull on the pull cord 130 thereby opening the flush valve 132 and releasing the excess water. Once the proper water level is reached, the float will ride downwardly closing the flush valve 132, causing downward articulation of the second rod 122 which causes downward articulation of the first rod 120 thereby triggering the microswitch and restarting the fan 100. The timer 138 will, at preset intervals, cause the solenoid 116 to raise the float 124 so that the flush valve 132 is opened in order to drain all water within the device 10 and thereby turning the fan 100 off. Once the water W is drained, the solenoid 116 lowers the float 124 in order to close the flush valve 132. The water fill valve 134 will introduce fresh water W into the device 10. Once the device 10 has the proper water level, the fan 100 is reactivated.

The on/off switch 140 can be used to switch the device off for maintenance and if desired, to place a disinfectant, such as a chlorine tablet, against the extension 136.

While the invention has been particularly shown and described with reference to an embodiment thereof, it will be appreciated by those skilled in the art that various changes in form and detail may be made without departing from the spirit and scope of the invention.

I claim:

1. An air cleaner comprising:

a housing, having a bottom, a top, and at least one side wall, defining an air chamber therein;

a first opening within the at least one side;

at least one liquid chamber for holding a liquid, each liquid chamber comprising a bracket having a side plate attached to at least one of the at least one side wall and terminating within the liquid and a top plate, the top plate connected to either another top plate or to one of the at least one side wall, a second opening disposed within the plate, and an intake tube having a first end passing through either the first opening or the second opening and a second end disposed within the liquid;

an exhaust port attached to the housing; and a fan, attached to the housing proximate the top.

2. The air cleaner as in claim 1 further comprising a diffuser plate disposed between the at least one air chamber and the fan.

3. The air cleaner as in claim 1 wherein each of the tops of the at least one liquid chamber is sloped.

4. The air cleaner as in claim 1 further comprising a switch operatively connected to the fan.

5. The air cleaner as in claim 1 further comprising a flush valve at the base of the housing.

6. The air cleaner as in claim 4 further comprising a flush valve at the base of the housing.

7. The air cleaner as in claim 6 further comprising:

a rod having a first end mechanically connected to the drain plug and a second end mechanically connected to the switch;

a float attached to the rod; and whereby when the liquid level falls below a first level or rises above a second level, the rod causes the switch to deactivate the fan.

8. The air cleaner as in claim 7 further comprising:

a solenoid mechanically connected to the rod;

a timer electrically connected to the solenoid; and whereby the timer causes periodic activation of the solenoid which causes articulation of the rod.

9. The air cleaner as in claim 1 further comprising introduction means for introducing liquid from the liquid source into the housing whenever the liquid within the housing falls below a first level and to terminate the introduction of the liquid into the housing once the liquid within the housing reaches a second level.

10. The air cleaner as in claim 9 wherein the introduction means comprises a liquid fill valve attached to a liquid source.

\* \* \* \* \*